United States Patent [19]

Kanazawa

[11] Patent Number: 4,801,177
[45] Date of Patent: Jan. 31, 1989

[54] RECLINING DEVICE OF SEAT

[75] Inventor: Yuzo Kanazawa, Gifu, Japan

[73] Assignee: Ikeda Bussan Co., Ltd., Ayase, Japan

[21] Appl. No.: 121,857

[22] Filed: Nov. 17, 1987

[30] Foreign Application Priority Data

Nov. 18, 1986 [JP] Japan .......................... 61-176939[U]

[51] Int. Cl.4 ............................................ A47C 1/025
[52] U.S. Cl. .................................... 297/367; 297/366
[58] Field of Search ............... 297/367, 376, 379, 366, 297/370, 368, 369

[56] References Cited

U.S. PATENT DOCUMENTS

| 3,902,757 | 9/1975 | Yoshimura | 297/367 |
| 3,966,253 | 6/1976 | Berghof et al. | 297/367 |
| 4,146,267 | 3/1979 | Mori et al. | 297/367 |
| 4,218,092 | 8/1980 | Schach et al. | 297/367 |
| 4,243,264 | 1/1981 | Bell | 297/367 |
| 4,541,672 | 9/1985 | Fukuta et al. | 297/367 |
| 4,591,207 | 5/1986 | Nithammer et al. | 297/367 X |
| 4,641,884 | 2/1987 | Miyashita et al. | 297/367 X |

FOREIGN PATENT DOCUMENTS

| 2605522 | 8/1977 | Fed. Rep. of Germany | 297/367 |
| 3027629 | 2/1982 | Fed. Rep. of Germany | 297/367 |
| 20523 | 2/1977 | Japan | 297/367 |
| 134340 | 8/1982 | Japan | 297/367 |

Primary Examiner—Peter A. Aschenbrenner
Assistant Examiner—José V. Chen
Attorney, Agent, or Firm—Foley & Lardner, Schwartz, Jeffery, Schwaab, Mack, Blumenthal & Evans

[57] ABSTRACT

In order to have the handle of an actuating lever settled in a recess of the seat cushion even when the seatback is inclined to its foremost inclined position, there is employed a pivotal lever which is provided with a pin. The pin is slidably engageable with a curved edge of a lock lever and slidably received in an arcuate slot of the actuating lever. Due to free movement of the pin in the slot, the movement of the lock lever caused by the foremost inclination of the seatback is achieved with no interruption with the actuating lever.

9 Claims, 3 Drawing Sheets

RECLINING DEVICE OF SEAT

BACKGROUND OF THE INVENTION

1. Field of the Invention

The present invention relates in general to seats of a so-called reclining type, and more particularly to a reclining device employed in such seats.

2. Description of the Prior Art

In order to clarify the task of the present invention, one conventional reclining device will be described with reference to FIGS. 6 and 7 of the attached drawings.

The conventional device shown in the drawings comprises a bracket 4 secured to a rear portion of a seat cushion 2, and an arm 5 secured to a seatback 3. The arm 5 is pivotally connected to the bracket 4 through a pivot shaft (no numeral), so that the seatback 3 is inclinable forward and rearward relative to the seat cushion 2. Although not shown in the drawings, a biasing spring is associated with the arm 5 to bias the seatback 3 to pivot forward. The arm 5 is formed at its lower end with teeth 5a which are latchingly engageable with teeth 6a formed on a lock lever 6. The lock lever 6 is pivotally connected at its one end to the bracket 4 through a pivot pin (no numeral). The other end of the lock lever 6 is formed with a recess or curved edge 6b which faces downward in FIGS. 6 and 7. An actuating lever 7 in the form of a crank is pivotally connected to the bracket 4 through a pivot pin (no numeral). One end of the lever 7 is provided with a pin 7a which is slidably engageable with the curved edge 6b of the lock lever 6. The other end of the lever 7 is provided with a handle 7b which is projected into a recess 2a formed in an upper side portion of the seat cushion 2 The position of the recess 2a will be understood from FIG. 3. Referring back to FIG. 6, a spring 8 is expanded between the lower end of the actuating lever 7 and the bracket 4 so as to bias the lever 7 to pivot in a counterclockwise direction about the pivot pin in this drawing, so that the pin 7a of the lever 7 is pressed against the curved edge 6b of the lock lever 6.

When, the handle 7b of the actuating lever 7 is lifted as is shown in FIG. 7, the pin 7a of the lever 7 is moved clockwise, sliding foward along the curved edge 6b of the lock lever 6. This movement of lock lever 6 due to its own weight thereby disengaging the teeth 6a. of the lock lever 6 from the teeth 5a of tee arm 5. The locked condition of the seatback 3 is thus cancelled, so that the seatback 3 is forced to incline forward to its foremost position by the force of the biasing spring associated therewith, as is shown in FIG. 7.

It is to be noted that under this foremost inclined condition of the seatback 3, a lower front swelled portion 5b of the arm 5 abuts on the lock lever 6 causing the curved edge 6b of the lock lever 6 to press against the pin 7a of the actuating lever 7. This means that when the seatback 3 is kept in its foremost inclined position as shown in FIG. 7, the handle 7b of the actuating lever 7 is kept projected in an unsightly manner from the recess 2a of the seat cushion 2.

When the seatback 3 is inclined rearward and stopped at a desired angular position, the lock lever 6 is raised and brought into latching engagement with the teeth 5a of the arm 5 due to a counterclockwise motion of the actuating lever 7 effected by the spring 8. Thus, the seatback 3 is locked at the desired angular position and the handle 7b becomes settled in the recess 2a.

However, the above-mentioned conventional reclining device has the following drawbacks due to its inherent construction.

That is, as is mentioned hereinabove, when the seatback 3 comes to its foremost inclined position, the handle 7b of the actuating lever 7 is projected from the recess 2a of the seat cushion 2. This is disadvantageous because the clothes of a seat occupant who has just risen up from the seat may be caught and thus torn by the projected handle 7b. Furthermore, due to interruption of the projected handle to the inclined seatback, the forward inclination of the seatback 3 is very limited.

SUMMARY OF THE INVENTION

It is therefore an essential object of the present invention to provide an improved reclining device which is free of the above-mentioned drawbacks.

According to the present invention, there is provided a reclining device for a seat which has a seat cushion and a seatback, the reclining device comprising a bracket secured to the seat cushion; an arm pivotally connected to the bracket and secured to the seatback, so that the seatback is pivotal relative to the seat cushion, the arm having a first toothed portion; a lock lever pivotally connected at its one end to the bracket, the lock lever having a second toothed portion which is latchingly engageable with the first toothed portion, the lock lever having at the other end a curved edge; a pivotal lever pivotally connected to the bracket and having a pin formed thereon, the pin being slidably engageable with the curved edge of the lock lever; first biasing means for biasing the pivotal lever in a direction to press the pin against the curved edge; and an actuating lever pivotally connected to the bracket in a manner to pivot concentric with the pivotal lever, the actuating lever having an enlarged end portion which is formed with an arcuate slot through which the pin of the pivotal lever slidably passes.

BRIEF DESCRIPTION OF THE DRAWINGS

Other objects and advantages of the present invention will become apparent from the following description when taken in conjunction with the accompanying drawings in which.

DETAILED DESCRIPTION OF THE INVENTION

Figure 1:
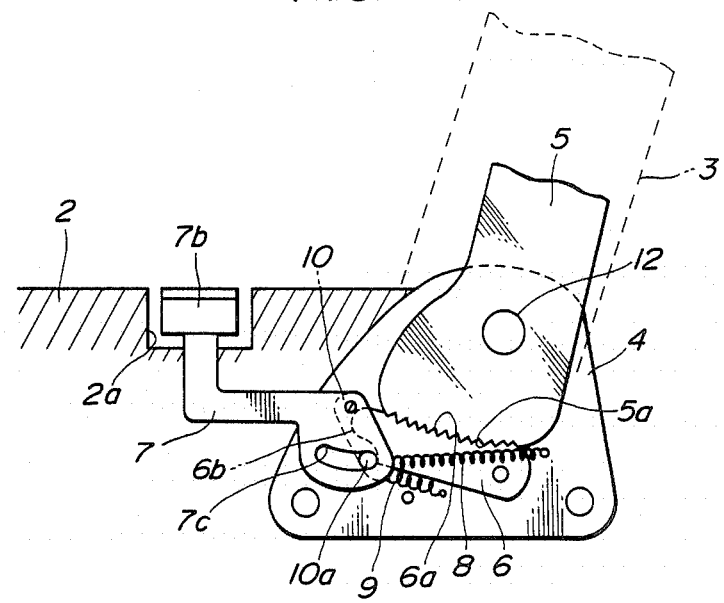
FIG. 1 is a side view of a reclining device of the present showing a condition wherein a seatback is locked at a desired angular position.
Figure 2:
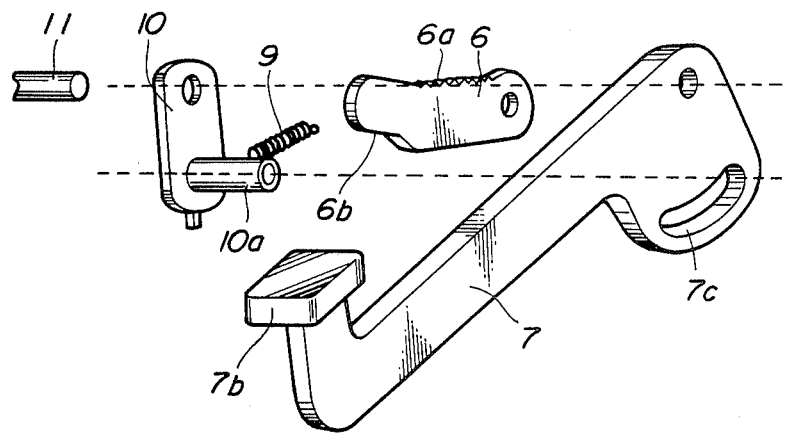
FIG. 2 is an exploded view of the reclining device with some parts removed for clarification of the drawing.
Figure 3:
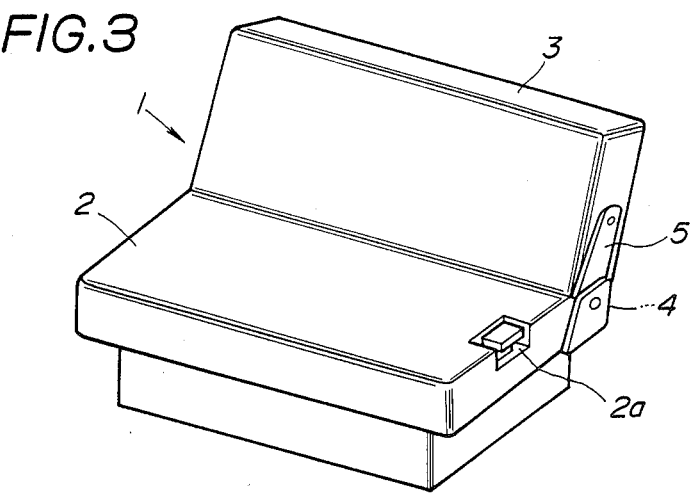
FIG. 3 is a perspective view of a bench-type seat to which reclining device of the invention is practically applied.

Referring to FIGS. 1 to 5 of the drawings, particularly FIG. 1, there is shown a reclining device according to the present invention. The reclining device is applied to a so-called "bench-type" seat 1 as shown in FIG. 3. The bench-type seat 1 comprises generally a seat cushion 2 and a seatback 3. As will be described in the following, due to provision of the reclining device 10 associated therewith, the seatback 3 is inclinable to a desired locked angular position relative to the seat cushion 2.

As is seen from FIG. 1, the reclining device comprises a bracket 4 secured to a rear portion of the seat cushion 2, and an arm 5 secured to the seatback 3. The arm 5 is pivotally connected through a pivot shaft 12 to the bracket 4, so that the seatback 3 is inclinable forward and rearward relative to the seat cushion 2. Although not shown in the drawings, a biasing spring is associated with the arm 5 to bias the same and thus the seatback 3 to pivot forward. The arm 5 is formed at its lower end with teeth 5a which are latchingly engageable with teeth 6a formed on a lock lever 6.

The lock lever 6 is pivotally connected at its one end to the bracket 4 through a pivot pin (no numeral). The other end of the lock lever 6 is formed with a recess or curved edge 6b. This curved edge 6b is slidably engageable with a pin 10a provided on a pivotal lever 10 (see FIG. 2).

The pivotal lever 10 is pivotally connected through a pivot shaft 11 to the bracket 4.

An actuating lever 7 in the form of crank is pivotally connected through the pivot shaft 11 to the bracket 4. That is, the actuating lever 7 has at one end an enlarged base portion which is pivotally connected to the pivot shaft 11 and at the other end a handle 7b which is projected into a recess 2a formed in an upper side portion of the seat cushion 2. The position of the recess 2a is well shown in FIG. 3.

The enlarged base portion of the actuating lever 7 is formed with an arcuate slot 7c which is concentric with the pivot shaft 11 and slidably receives therein the pin 10a of the pivotal lever 10.

A spring 8 is expanded between the enlarged base portion of the actuating lever 7 and the bracket 4 thereby to bias the lever 7 in a counterclockwise direction in FIG. 1, and another spring 9 is expanded between the pin 10a of the pivot lever 10 and the bracket 4 thereby to bias the pivotal lever 10 in a counterclockwise direction in the same drawing.

In the following, operation of the reclining device of the invention will be described.

For ease of understanding, it will be commenced with respect to an actually used-condition of the reclining device, as shown in FIG. 1, wherein the seatback 3 is locked at a desired angular position. Under this condition, due to the biasing force of the spring 9, the pin 10a on the pivotal lever 10 is pressed on the curved edge 6b of the lock lever 6 thereby to bring the teeth 6a of the same 6 into latching engagement with the teeth 5a of the arm 5. Furthermore, due to the biasing force of the spring 8, the actuating lever 7 is kept in its rest position having the handle 7b neatly settled in the recess 2a of the seat cushion 2.

Figure 4:
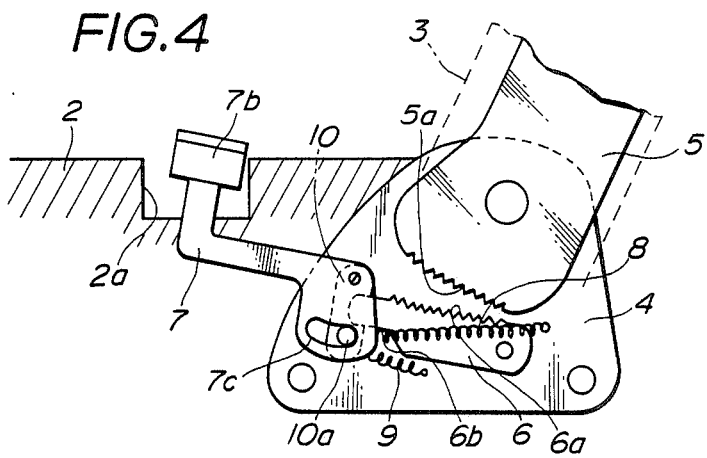
FIG. 4 is a view similar to FIG. 1, but showing a condition wherein the reclining device is in an unlocked condition.

When now the handle 7b is lifted as is shown in FIG. 4, the right end wall of the arcuate slot 7c is brought into contact with the pin 10a of the pivotal lever 10 and moves the same in a clockwise direction about the pivot shaft 11. This movement of the pin 10a induces a slight counterclockwise or downward movement of the lock lever 6 due to its own weight thereby disengaging the teeth 6a of the lock lever 6 from the teeth 5a of the arm 5. The locked condition of the seatback 3 is thus cancelled, so that the seatback 3 is forced to incline forward to its foremost position by the force of the biasing spring associated therewith, as is shown in FIG. 5.

Figure 5:
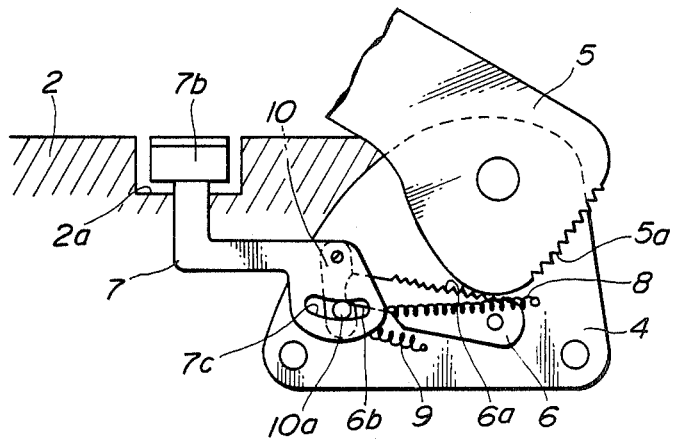
FIG. 5 is a view also similar to FIG. 1, but showing a condition wherein the seatback is inclined to its foremost inclined position.
Figure 6:
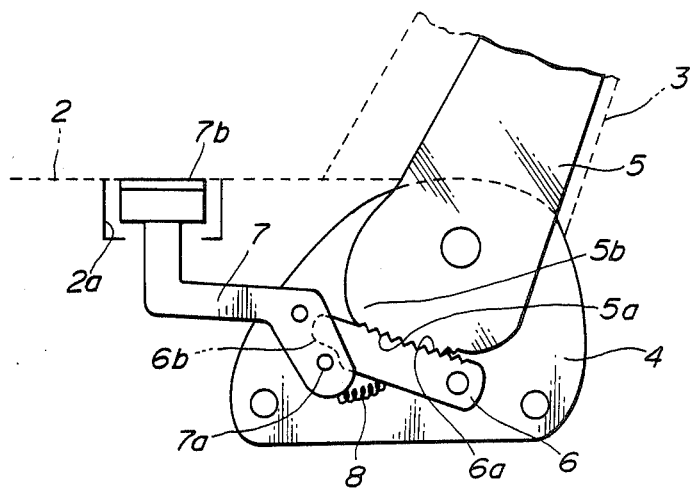
FIG. 6 is a side view of the conventional reclining device which has been mentioned hereinabove.
Figure 7:
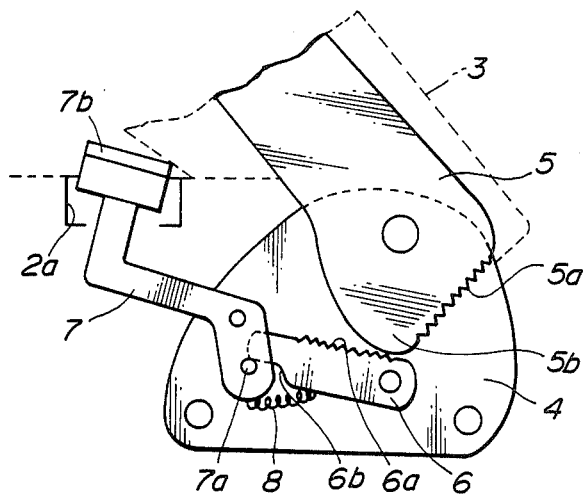
FIG. 7 is a view similar to FIG. 6, but showing a condition wherein the seatback assumes its forward inclined position.

When, as is seen in FIG. 5, the seatback 3 assumes its foremost position, a lower front swelled portion 5a of the arm 5 abuts on the lock lever 6 causing the curved edge 6b of the lock lever 6 to press against the pin 10a of the pivot lever 10. Thus, the pivotal lever 10 may be somewhat moved in a counterclockwise direction. However, this movement of the pivotal lever 10 does not induce any movement of the actuating lever 7. This is because, during the movement of the pivotal lever 10, the pin 10a fixed thereto moves freely in the slot 7c.

The free movement of the pin 10a in the slot 7c means that even when the seatback 3 assumes its foremost inclined position, the actuating lever 7 can be instantly returned to its rest position upon release of operator's hand from the handle 7b due to the biasing force of the spring 8. Thus, unlike the case of the above-mentioned conventional reclining device, the handle 7b is neatly received in the recess 2a when the seatback 3 assumes its foremost inclined position.

When now the seatback 3 is inclined rearward, the lower front swelled end 5a of the arm 5 is moved in a direction away from the lock lever 6. Thus, during this movement, the lock lever 6 is raised due to a counterclockwise movement of the pin 10a effected by the spring 9, and finally the lock lever 6 is brought into latching enagement with the teeth 5a of the arm 5 when the seatback 3 is raised up to a desired angular position. Now, the reclining device assumes the actually used condition as shown in FIG. 1.

As will be understood from the foregoing description, in accordance with the present invention, the handle 7b of the actuating lever 7 is neatly settled in the recess 2a of the seat cushion 2 even when the seatback 3 assumes the foremost inclined position. Thus, the undesirable matters encountered in the above-mentioned conventional reclining device do not occur.

What is claimed is:

1. A reclining device for a seat which has a seat cushion and a seatback, said reclining device comprising:
    a bracket secured to said seat cushion;
    an arm pivotally connected to said bracket and secured to said seatback, so that said seatback is pivotal relative to said seat cushion, said arm having a first toothed portion;
    a lock lever having one end pivotally connected to said bracket, said lock lever having a second toothed portion which is latchingly engageable with said first toothed portion, said lock lever having at the other end a curved edge;
    a pivotal lever pivotally connected to said bracket and having a pin formed thereon, said pin being slidably engageable with said curved edge of the lock lever thereby forming a cam means which operably pivots the second toothed portion in and out of engagement with the first toothed portion;
    first biasing means for biasing said pivotal lever in a direction to press said pin against said curved edge; and an actuating lever pivotally connected to said bracket in a manner to pivot concentric with said pivotal lever, said actuating lever having a enlarged end portion which is formed with an arcuate slot through which said pin of the pivotal lever slidably passes.

2. A reclining device as claimed in claim 1, further comprising second biasing means which biases said actuating lever in the same direction as the direction in which said pivotal lever is biased by said first biasing means.

3. A reclining device as claimed in claim 2, in which said slot of said actuating lever is shaped concentric with a common pivot axis about which said pivotal lever and said actuating lever pivot.

4. A reclining device as claimed in claim 3, in which said actuating lever has a handle which is projected into a recess formed in said seat cushion of the seat.

5. A reclining device as claimed in claim 4, in which said first toothed portion comprises teeth formed on a lower end of said arm.

6. A reclining device as claimed in claim 5, in which said second tooth portion comprises teeth formed on an upper side of said lock lever.

7. A reclining device as claimed in claim 6, in which said first biasing means is a spring which is expanded between said pivotal lever and said bracket.

8. A reclining device as claimed in claim 7, in which said second biasing means is a spring which is expanded between said enlarged end portion of the actuating lever and said bracket.

9. A reclining device as claimed in claim 8, in which said actuating lever is shaped like a crank having the enlarged end portion and the handle formed at longitudinally opposed ends thereof and projected in the opposite directions.

* * * * *